(12) United States Patent
Kesler (10) Patent No.: US 10,871,918 B2
(45) Date of Patent: Dec. 22, 2020

(54) WRITING COMPOSITE OBJECTS TO A DATA STORE

(71) Applicant: INTUIT INC., Mountain View, CA (US)

(72) Inventor: Grigoriy Kesler, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 91 days.

(21) Appl. No.: 15/667,448

(22) Filed: Aug. 2, 2017

(65) Prior Publication Data

US 2019/0042149 A1 Feb. 7, 2019

(51) Int. Cl.
*G06F 3/06* (2006.01)
*G06F 9/30* (2018.01)
*G06F 9/46* (2006.01)
*G06F 16/13* (2019.01)
*G06F 16/901* (2019.01)

(52) U.S. Cl.
CPC .......... *G06F 3/0659* (2013.01); *G06F 3/0604* (2013.01); *G06F 3/067* (2013.01); *G06F 9/30* (2013.01); *G06F 9/46* (2013.01); *G06F 16/13* (2019.01); *G06F 16/9024* (2019.01)

(58) Field of Classification Search
CPC ...... G06F 3/0659; G06F 3/0604; G06F 3/067; G06F 17/30091; G06F 17/30958
See application file for complete search history.

(56) References Cited

U.S. PATENT DOCUMENTS

| 2007/0220031 | A1 | 9/2007 | MacMahon et al. |
| 2008/0140636 | A1 | 6/2008 | Brodhun et al. |
| 2010/0250651 | A1 | 9/2010 | Bi et al. |
| 2014/0032525 | A1 | 1/2014 | Merriman et al. |
| 2016/0306565 | A1 | 10/2016 | Gao et al. |
| 2017/0091262 | A1* | 3/2017 | Beard ............... G06F 17/30377 |

OTHER PUBLICATIONS

International Search Report and Written Opinion dated Nov. 16, 2018 for Application No. PCT/US2018/044809.

* cited by examiner

*Primary Examiner* — Reginald G Bragdon
*Assistant Examiner* — Aaron D Ho
(74) *Attorney, Agent, or Firm* — Patterson + Sheridan, LLP (57) ABSTRACT

This disclosure relates to optimizing write requests based on an object dependency graph. An example method generally includes receiving, from a client device, a write request specifying an object to be written to the data store. A gateway server determines, based on an object dependency graph associated with the specified object and identifying relationships between the specified object and one or more dependency objects, one or more dependency objects to be written to the data store. The gateway server generates a plurality of write requests for the specified object and the one or more dependency objects and generates an execution plan for the plurality of write requests based on the object dependency graph. The gateway server executes the plurality of write requests based on the execution plan.

20 Claims, 6 Drawing Sheets

WRITING COMPOSITE OBJECTS TO A DATA STORE

BACKGROUND

Field

Embodiments presented herein generally relate to writing data across a plurality of data stores, and more specifically to optimizing write operations for composite data objects written to a plurality of domains.

Description of the Related Art

Application programming interfaces (APIs) generally expose various routines and methods to software developers for use in writing data in a software application. These APIs may be accessible programmatically (e.g., as function calls in an application or function library) or via a web service (e.g., WSDL) for web-based applications, which may invoke the functionality exposed by an API using a Representational State Transfer function call, HTTP POST requests, a Simple Object Access Protocol (SOAP) request, and the like. Typically, the functions exposed by an API include functions for writing discrete items of data to a data store. The API may define a function name and mandatory and optional arguments that a client application can provide when invoking a specified function.

Client applications generally invoke one or more functions of an API to write data to one or more data stores. For data operations that commit data that is not dependent on other data, the client application may generate a single write query to write that data to the one or more data stores. However, for data operations that commit composite data, or data that depends on the presence of other data in the one or more data stores, the client application may invoke multiple function calls, which may cause a server application to generate and execute multiple write operations on the one or more data stores. Because each write operation generally requires time to process to completion, executing a series of write operations may increase latency in a computing system. Further, if write operations are executed out-of-order, write operations may fail because data that is required to exist by a composite data object may not exist in the one or more data stores.

SUMMARY

One embodiment of the present disclosure includes a method for writing data to a data store. The method generally includes receiving, from a client device, a write request specifying an object to be written to the data store. A gateway server determines, based on an object dependency graph associated with the specified object and identifying relationships between the specified object and one or more dependency objects, one or more dependency objects to be written to the data store. The gateway server generates a plurality of write requests for the specified object and the one or more dependency objects and generates an execution plan for the plurality of write requests based on the object dependency graph. The gateway server executes the plurality of write requests based on the execution plan.

Another embodiment provides a computer-readable storage medium having instructions, which, when executed on a processor, performs an operation for writing data to a data store. The operation generally includes receiving, from a client device, a write request specifying an object to be written to the data store. A gateway server determines, based on an object dependency graph associated with the specified object and identifying relationships between the specified object and one or more dependency objects, one or more dependency objects to be written to the data store. The gateway server generates a plurality of write requests for the specified object and the one or more dependency objects and generates an execution plan for the plurality of write requests based on the object dependency graph. The gateway server executes the plurality of write requests based on the execution plan.

Still another embodiment of the present disclosure includes a processor and a memory storing a program, which, when executed on the processor, performs an operation for writing data to a data store. The operation generally includes receiving, from a client device, a write request specifying an object to be written to the data store. A gateway server determines, based on an object dependency graph associated with the specified object and identifying relationships between the specified object and one or more dependency objects, one or more dependency objects to be written to the data store. The gateway server generates a plurality of write requests for the specified object and the one or more dependency objects and generates an execution plan for the plurality of write requests based on the object dependency graph. The gateway server executes the plurality of write requests based on the execution plan.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Generally, client applications write data to a plurality of data stores by invoking one or more function calls exposed by an API. Client applications manage the complexity of writing composite data objects, or data objects that depend on the existence of other data objects in the plurality of data stores, by explicitly ordering a sequence of write operations to write dependency objects to the plurality of data stores before writing the composite objects to the plurality of data stores. Because the ordering of write operations is generally hard-coded, client applications may generate a large number of write requests for the one or more data stores to process. Each write request entails some amount of processing time, and the proliferation of write requests may create communications inefficiencies (e.g., by continually adding write requests to an execution queue). Adding write requests to an execution queue may introduce latency into a system, which may degrade system performance, in some cases to such a degree that a system becomes unusable.

Embodiments presented herein provide a system for optimizing write operations for composite data objects committed to one or more data stores. The system optimizes write requests using a gateway server to receive write requests identifying an object to be written to a data store and to generate an execution plan for each request. The gateway server constructs the execution plan for a write request by evaluating the identified object to discover the dependency objects to be stored in the one or more data stores before the identified object can be committed to the one or more data stores. The gateway server accesses the target object and traverses a graph of references to other objects within the target object. As the gateway server traverses the object graph of references, the gateway server identifies the type of objects that the target object depends on. The gateway server decomposes the write request into a set of ordered write operations based on the type of object dependencies discovered during the graph traversal.

By moving operational complexity from an application executing on a client device to a gateway server, write operations for composite objects may be completed more efficiently than write operations explicitly defined in a client application. The client application can transmit a single write request to the gateway server, and the gateway server can generate an execution plan that writes the object specified by the write request and the specified object's dependency objects in a manner that minimizes discrete write requests executed on the one or more data stores. By minimizing discrete write requests executed on the one or more data stores, the gateway server can reduce the amount of time needed to commit composite objects and the associated dependency objects to a plurality of data stores. Accelerating commit times for data operations may additionally reduce the amount of time that a user may need to wait for data operations to complete successfully (e.g., where write requests from multiple client devices are queued for processing).

Figure 1:
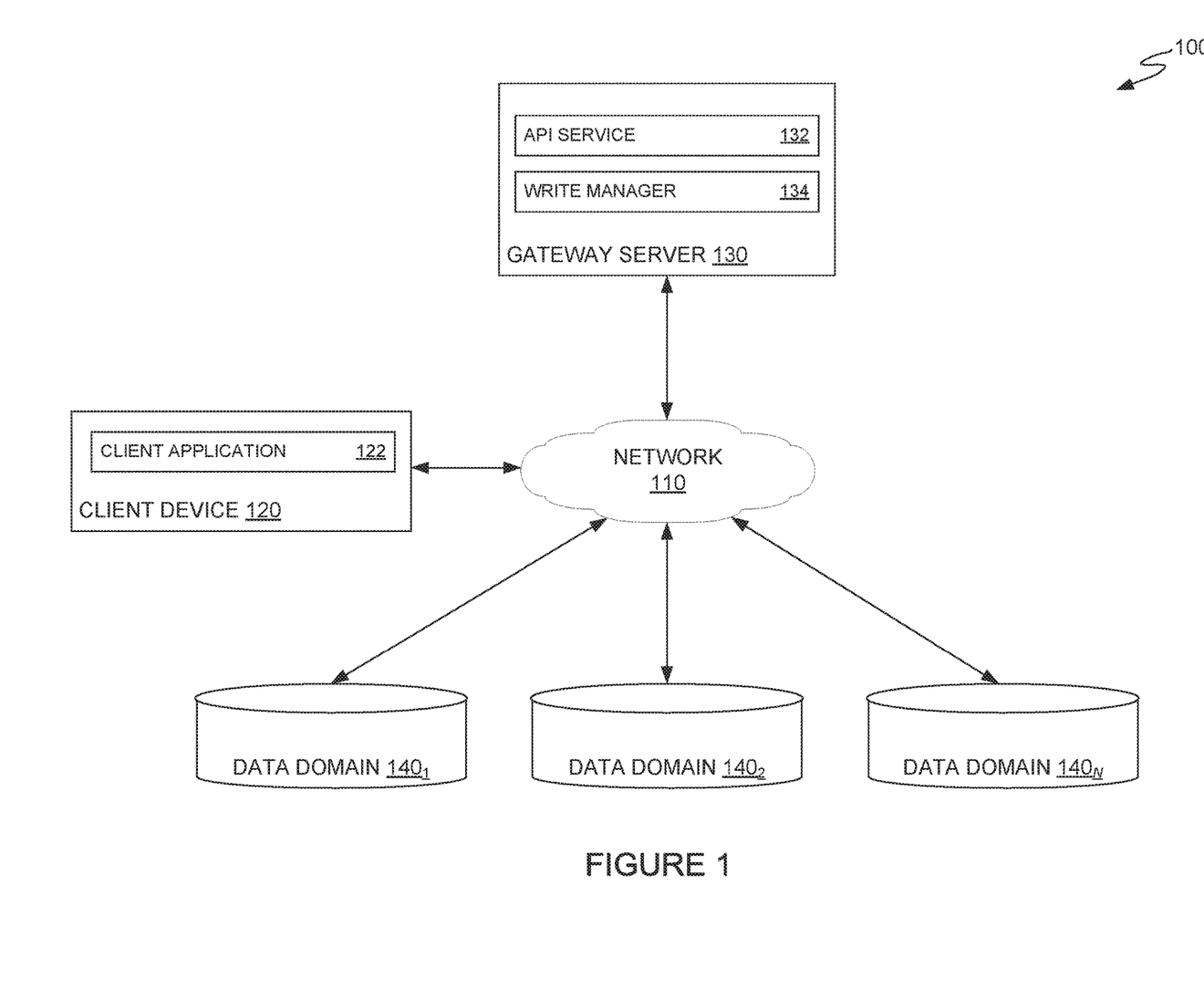
FIG. 1 illustrates an example computing system, according to one embodiment.

FIG. 1 illustrates an example computing system 100, according to one embodiment. As shown, system 100 includes a client device 120, a gateway server 130, and one or more data domains 140 that communicate through network 110.

Client device 120, as illustrated, includes a client application 122. Client application 122 generally provides a user interface that allows a user of client device 120 to input data to be committed to one or more data domains 140 through gateway server 130. To commit data to the one or more data domains 140, client device 120 may, upon user action (e.g., a user clicking or tapping a button or other user interface element for submitting data to gateway server 130), invoke an API function call to transmit the data entered into the user interface to gateway server 130. As discussed herein, client application 122 executing on client device 120 need not generate an execution plan to write dependency objects and the composite object to the one or more data domains 140. Rather, client application 122 can invoke a single API function call, and, as described in further detail herein, gateway server 130 can use an object dependency graph associated with the composite object to generate a plurality of write requests and an execution plan that optimizes execution of the plurality of write requests.

Gateway server 130 is generally configured to receive requests to write composite objects from a client device 120, generate one or more write requests to write the composite object and dependency objects to one or more data domains 140, and optimize execution of the generated write requests. As illustrated, gateway server 130 includes an API service 132 and a write manager 134.

API service 132, in some cases, may expose functions of an API as a graph projection based on an API schema. The graph projection of the API may provide, for example, a structure that allows an API service 132 to interact with the API (e.g., using a request indicating a navigable path through the graph projection of the API). The structure may represent, for example, a protocol binding for a request protocol that allows API service 132 to respond to requests by identifying nodes in the graph projection of the API and the associated data sources to interact with. Each node in the graph projection of the API generally specifies the name of a function and parameters for invoking the function, and navigable paths in the graph projection of the API generally specify a sequence of functions to perform to interact with (i.e., read, write, or modify) a specified piece of data. To build a projection of the API, API service 132 generally examines the schema definitions for each node defined in the API. The schema definition for each node defined in the API generally includes the name of the node, relationships to one or more parent nodes, functions supported by a node, and so on. The projection of the API corresponds to a hierarchy of nodes from the graph with n levels starting from a root node. API service 132 may begin with a single root node in a graph projection of the API, and as API service 132 reads schema definitions for each node, API service 132 can add an identifier representing the node (e.g., the node name) to an appropriate place (level) in the graph. For example, API service 132 may add a first-level node in the graph linked to the root node for a schema definition that identifies a node's parent as the root node. If API service 132 reads a schema definition for a child node with a parent node that is not currently represented in the graph, API service 132 can search an API schema for the schema definition of the identified parent node. The API schema can add the identified parent node to the appropriate level in the graph and add the child node to the graph at a level below the parent node.

When API service 132 receives a query from a client device 120, API service 132 can verify that the received query is valid. In some cases, where API service 132 exposes functions based on a graph schema, API service 132 can traverse a graph projection of the API to verify that the received query is valid. If API service 132 determines that the received query is valid, API service 132 can invoke write manager 134 to generate a plurality of write requests to be executed against one or more of the data domains 140 and generate an execution plan to optimize execution of the generated plurality of write requests, as discussed in further detail herein.

Write manager 134 generally receives a write request from API service 132 specifying an object to be written to one or more of the data domains 140 and generates an execution plan to optimize execution of a plurality of write requests that commit dependency objects and the object specified in a write request (a composite object) to the one or more data domains 140. As used herein, a composite object refers to an object written to one or more data domains 140 that depend on the existence of one or more other objects (dependency objects) in the one or more data domains 140 in order to be successfully committed to a data domain.

To generate the write requests for the composite object and the one or more dependency objects, write manager 134 generally traverses an object dependency graph associated with the composite object to determine the dependency objects that are to be committed to the one or more data domains 140 (if such objects do not already exist) before the composite object can be committed to the one or more data domains 140. An object dependency graph generally includes a plurality of nodes, with each node specifying a data object, and with connections between nodes specifying data object dependencies for the data object represented by a node. In some cases, the dependency graph associated with the composite object may be stored statically at gateway server 130 and updated as the API is updated. In some cases, write manager 134 can obtain the object dependency graph through introspection of the composite object. To obtain the object dependency graph through introspection of the composite object, write manager 134 can examine the properties of the composite object (e.g., data objects that the composite object relies on or references) to identify one or more dependency objects associated with the composite object. Write manager 134 can subsequently examine the properties of each of the one or more dependency objects to identify additional dependency objects (i.e., dependency objects in a lower level of a dependency graph) until write manager 134 determines that none of the dependency objects in the lowest level of the dependency graph have any other object dependencies.

Write manager 134 generates write requests for each node in the dependency graph. Further, using the generated write requests and the order in which objects appear in the dependency graph, write manager 134 generates an execution plan that optimizes execution of the write request received from client device 120. Generally, the execution plan may entail a queue (or other first-in, first-out data structure) where write requests for dependency objects are stored, and thus executed, before write requests for higher-level dependency objects or the composite object. In one example, write manager 134 can generate an execution plan by storing write requests for objects at the bottom level of an object dependency tree first and storing write requests for progressively higher levels of the object dependency tree based on the level of the tree at which the object is located.

In some cases, write manager 134 can optimize the generated execution plan by identifying write requests that can be performed substantially in parallel (e.g., write requests that can be performed simultaneously). For example, suppose that an object dependency tree for a given composite object identifies a plurality of dependency objects at the same level of the object dependency tree, and each of the plurality of dependency objects is associated with a different data domain 140. Because none of the plurality of dependency objects depend on the existence of each other, write manager 134 can determine that the write requests for the plurality of dependency objects can be executed substantially in parallel. In some cases, the write requests may be stored in the execution plan as a set of write requests, and when write manager 134 executes write operations according to the generated execution plan, write manager 134 can extract the individual write requests from the set and execute the write requests in parallel. By executing independent write requests at the same level of the object dependency tree in parallel (or substantially in parallel), write manager 134 can reduce the number of write requests executed sequentially, which may reduce the amount of time needed to commit a composite object and its dependency objects to the one or more data domains 140.

In one example, write manager 134 can optimize the generated execution plan by examining the location (i.e., the data domain 140) at which data is to be stored. For example, if multiple objects at the same level in the object dependency tree are to be stored at the same location, write manager 134 can coalesce the write requests for the multiple objects into a single write request. By coalescing the write requests for multiple objects into a single write request, write manager 134 can reduce the number of write requests transmitted to a data domain 140 for processing, which in turn may reduce the amount of time needed to complete the write request.

In another example, write manager 134 can optimize the generated execution plan by determining whether certain data objects already exist in the one or more data domains 140. If a dependency object with the same data as that specified in the write request associated with the dependency object, write manager need not write a duplicate dependency object to the one or more data domains 140. Because the dependency object need not be written, write manager 134 can remove the write request associated with the dependency object from the execution plan, which may reduce the number of write commands generated by write manager 134 for execution and, in turn, reduce the amount of time needed to complete the write request received from the client device 120.

After write manager 134 optimizes the generated execution plan, write manager 134 can sequentially execute the write requests in the execution plan to commit dependency objects to the one or more data domains 140 prior to writing the composite object to the one or more data domains 140. In some cases, write manager 134 may monitor execution of the write requests to determine whether a write request successfully executed (e.g., whether the write request committed data to the specified data domain 140) and, if the write request failed, attempt to execute the write request again. Upon determining that the write requests associated with a particular position in the execution plan (e.g., the queue of write requests) successfully executed, write manager 134 can execute subsequent write requests that depend on the existence of the executed write requests. In some cases, if a write request fails a threshold number of times, write manager 134 generates an error message indicating such a failure and transmit the error message to client device 120.

For example, assume that a user of client device 120 has transmitted a request to generate an invoice (a composite object) that has two dependency objects: a customer object and plurality of invoice line item objects. When write manager 134 receives the write request from client device 120 specifying the type of the composite object to be written to the plurality of data domains 140 and the data to be written to the plurality of data domains 140. Write manager 134 can introspect into the definition of the "invoice" composite object to generate an object dependency graph illustrating that the "invoice" object depends on the existence of a "customer" object and an "invoice line item" object. Based on the generated object dependency graph, write manager 134 generates an execution plan with a plurality of write requests: one or more write requests for "invoice line item" objects, a write request for the "customer" object, and a write request for the "invoice" object, where the "invoice line item" and "customer" objects are written to the plurality of data domains 140 before the "invoice" object is written to the plurality of data domains 140.

After write manager 134 generates the one or more write requests and the execution plan for writing an invoice to the plurality of data domains 140, write manager 134 can optimize the execution plan to reduce the number of successive write requests to be executed. For example, if the invoice includes multiple line item objects, the write requests for the multiple "invoice line item" objects may be coalesced into a single write request. Further, because the "invoice line item" object write request is not dependent on the "customer" object write request, write manager 134 can schedule the write requests for the "invoice line item" objects and the "customer" object to execute in parallel or substantially in parallel. The execution plan may thus result in the generation of a write request queue having two items: a first item including the set of write requests for the "invoice line item" objects and the "customer" object, and a second item including the write request for the "invoice" object referencing the "customer" object and the one or more "invoice line item" objects.

Data domains 140 generally include a plurality of data stores for storing data objects generated by users of client application 122. These data stores may, in some cases, be geographically distinct locations at which data and associated data processing routines are stored. In a distributed system, different types of data may be stored in different locations to satisfy, for example, data privacy requirements for different countries and so on.

Figure 2:
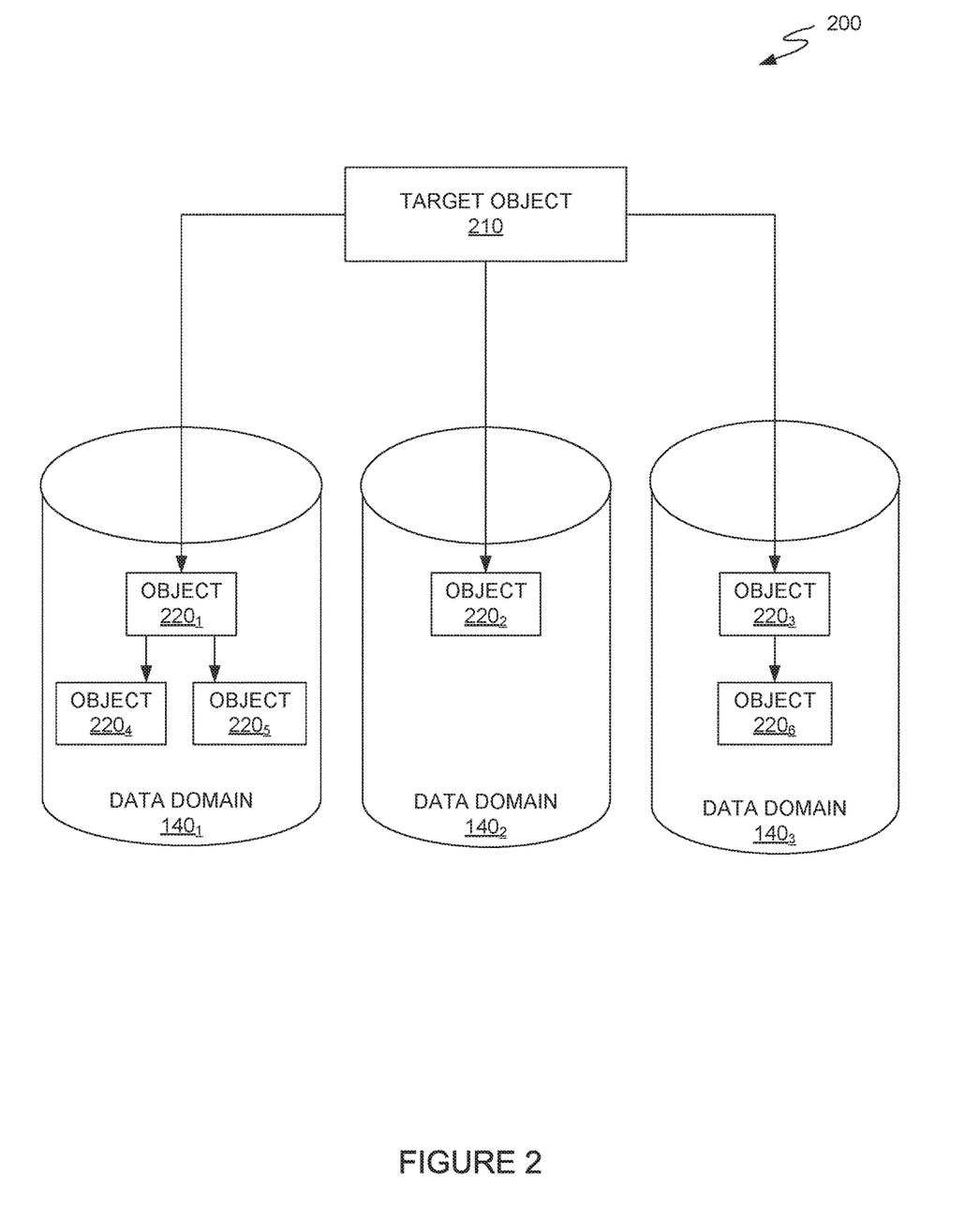
FIG. 2 illustrates an example object dependency graph with dependency objects spread across a plurality of data stores, according to one embodiment.

FIG. 2 illustrates an example object dependency graph 200 for a target object specified in a write request from client device 120, according to one embodiment. As illustrated, target object 210 directly depends on the existence of objects $220_1$, $220_2$, and $220_3$ across data domains $140_1$, $140_2$, and $140_3$. Further, as illustrated, object $220_1$ depends on the existence of objects $220_4$ and $220_5$, and object $220_3$ depends on the existence of object $220_6$ in data domain $140_3$.

To generate an execution plan for writing target object 210 and the objects 220 to the one or more data domains 140, write manager 134 uses the object dependency graph 200 to schedule write operations to minimize the number of write operations that are executed against the one or more data domains 140, as discussed above. In this example, the execution plan may be organized into three groups of write requests. A first group of write requests, corresponding to the bottom-most level of object dependency graph 200, may include write requests for objects $220_4$, $220_5$, and $220_6$, which may be executed in parallel or substantially in parallel. Because objects $220_4$ and $220_5$ are defined as objects that reside in the same data domain (i.e., in data domain $140_1$), write requests for objects $220_4$ and $220_5$ may be coalesced into a single write request. A second group of write requests, which may be scheduled to execute after the first group of write requests successfully commits objects $220_4$, $220_5$, and $220_6$ to data domains $140_1$ and $140_3$, may include write requests for objects $220_1$, $220_2$, and $220_3$. The write requests for objects $220_1$, $220_2$, and $220_3$ may be scheduled to execute in parallel or substantially in parallel. Finally, a third write request, which commits target object 210 to the data domain 140 with which target object 210 is associated, may be scheduled to execute after the second group of write requests successfully commits objects $220_1$, $220_2$, and $220_3$ to data domains $140_1$, $140_2$, and $140_3$, respectively.

Figure 3:
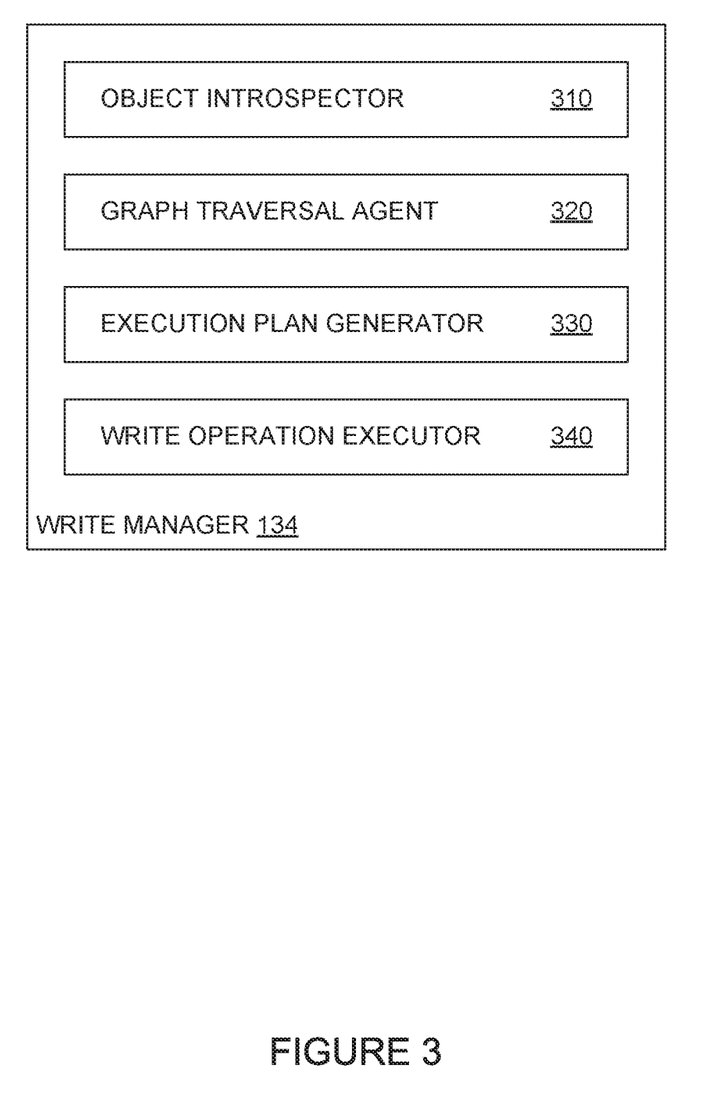
FIG. 3 illustrates an example write manager that uses object dependency graph data to execute a write request, according to one embodiment.

FIG. 3 illustrates an example write manager 134, according to an embodiment. As illustrated, write manager 134 generally includes an object introspector 310, graph traversal agent 320, execution plan generator 330, and write operation executor 340.

Object introspector 310 generally receives a write request specifying a target object to be written to one or more data domains 140 and examines the definitions of the target object and the dependency objects of the target object to generate an object dependency graph. To generate the object dependency graph for the target object, object introspector 310 may generate a graph with the target object as the root node of the graph and the one or more immediate dependency objects as nodes in a first level below the root node of the graph and connected to the root node. For each of the immediate dependency objects of the target object, object introspector 310 examines the definition of those objects to identify dependency objects for each of the immediate dependency objects and add those dependency objects to a lower level of the graph. Object introspector 310 generally continues to examine object definitions until the objects at the bottom of the object dependency graph do not have any object dependencies (i.e., are independent objects).

Graph traversal agent 320 generally uses the object dependency graph to generate an initial execution plan for the write requests associated with the target object (or composite object) and the one or more dependency objects. Graph traversal agent 320 may initially populate a queue associated with the execution plan with write requests in order of a level at which the objects associated with the write requests appear in the object dependency graph. In some cases, graph traversal agent 320 can generate write requests for each object at a specific level in the object dependency graph and store the set of write requests as a single operation in the queue associated with the execution plan. By coalescing a set of write requests into a plurality of write requests to execute in parallel or substantially in parallel, graph traversal agent 320 can reduce latency for writing a composite object to a data domain 140 by executing operations against different data domains 140 in parallel rather than sequentially.

Execution plan generator 330 can, in some cases, modify the initial execution plan generated by graph traversal agent 320 to optimize the execution plan by reducing the number of sequential write requests that are to be executed against the one or more data domains 140. As discussed above, execution plan generator 330 can coalesce write requests for objects at the same level of the object dependency graph and targeting the same data domain 140 into a single write operation that commits a plurality of data objects to the data domain 140. By coalescing write operations for objects at the same level of the object dependency graph into a single write operation, execution plan generator 330 can reduce the number of operations executed against the one or more data domains 140, which may reduce the amount of time needed to commit a composite object and the one or more dependency objects to the one or more data domains 140.

Write operation executor 340 uses the execution plan generated by execution plan generator 330 to commit the composite object and the one or more dependency objects to the one or more data stores 140. As discussed, the execution plan may, in some cases, be structured as a queue in which parallelizable operations may be stored as a single data item in the queue such that parallelizable operations may be executed simultaneously or substantially simultaneously. Write operation executor 340 may extract top item from the execution plan and route the write requests to the appropriate data stores 140 for processing. Upon determining that the write requests at the top of the queue executed successfully, write operation executor 340 can remove the set of write requests from the execution plan queue and execute the next set of write requests in the execution plan queue (e.g., the write requests at a higher level of the object dependency graph).

In some cases, if write operation executor 340 determines that a write request failed (e.g., receives an error message indicating a failure of a write request from a data store 140), write operation executor 340 can attempt to execute the write request until execution succeeds. In some cases, if write operation executor 340 detects that a threshold number of write requests have failed for the same dependency object, write operation executor 340 can discontinue write operations for the composite object and notify client application 122 that write operations failed for the composite object.

Figure 4:
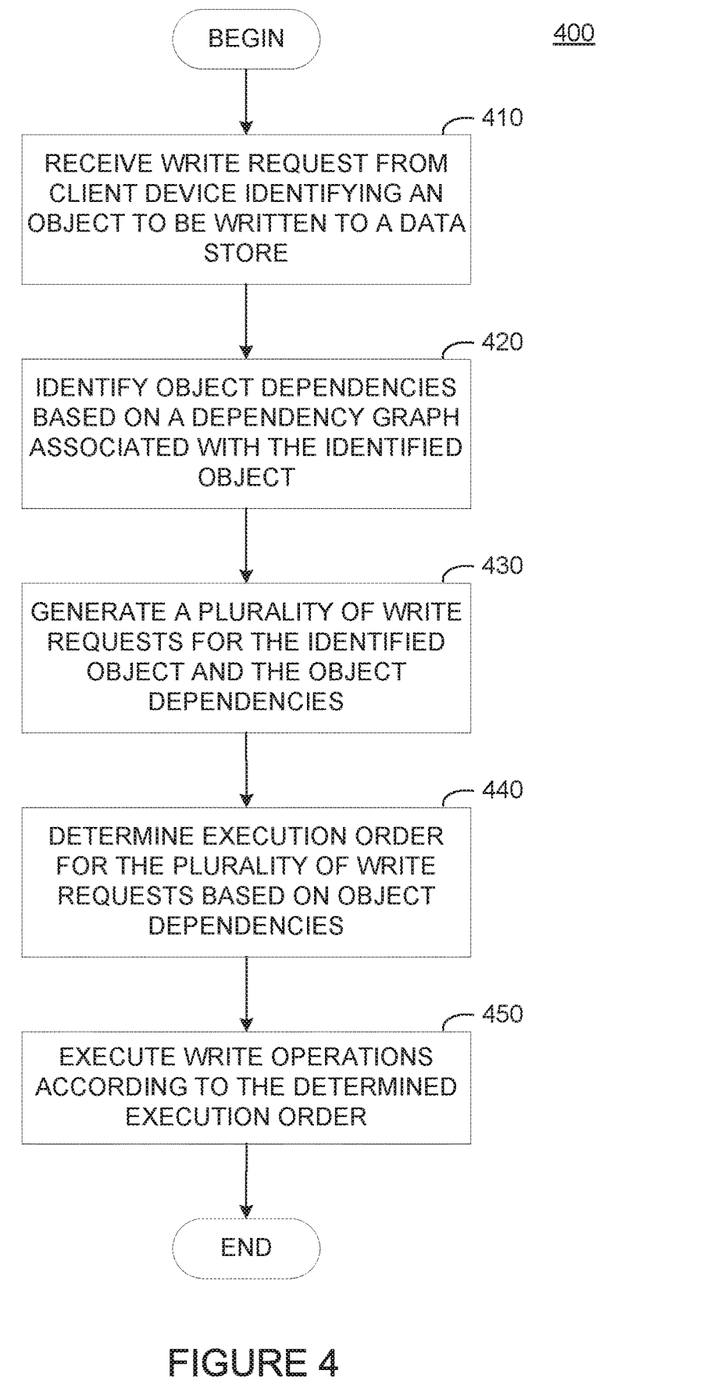
FIG. 4 illustrates example operations for generating an execution plan to write a specified object and the dependency objects to one or more data stores based on an object dependency graph, according to one embodiment.

FIG. 4 illustrates example operations 400 that may be executed by a write manager 134 for generating an optimized execution plan for writing a composite object and its dependency objects to one or more data domains 140, according to an embodiment. As illustrated, operations 400 begin at step 410, where write manager 134 receives a write request from a client device. The write request may include information identifying a composite object to be written to one or more data domains 140.

At step 420, write manager 134 identifies object dependencies based on a dependency graph associated with the identified object. In some cases, write manager 134 can identify object dependencies by traversing a dependency graph stored at the gateway server and defined a priori for the identified object. In some cases, to identify object dependencies based on a dependency graph, write manager 134 can generate an object dependency graph by introspecting into the definition of the composite object to identify the one or more direct dependency objects of the composite object. The object dependency graph may be structured with the composite object as the root node of the object dependency graph and with the immediate dependency objects of the composite object as the nodes at the first level of the object dependency graph below the root node. For each dependency object at the first level of the object dependency graph, write manager 134 can introspect into a definition of the dependency object and, if the dependency object depends on additional dependency objects, write manager can add nodes for the additional dependency objects into the object dependency graph at a lower level in the graph.

At step 430, write manager 134 generates a plurality of write requests for the identified object and the object dependencies. In some cases, write manager 134 can generate the plurality of write requests as a set of discrete write requests for each dependency object, and ordered in a manner that causes objects to be written from the bottom of the object dependency graph to the top of the object dependency graph.

At step 440, write manager 134 determines an execution order for the plurality of write requests based on object dependencies identified in the object dependency graph. As discussed, in some cases, write manager 134 can determine an execution order for the plurality of write requests by reducing a number of write requests to be executed against the one or more data domains 140. For example, write manager 134 can identify write requests that can be coalesced into a single write request against an identified data domain 140 (e.g., write operations for different objects stored at the same data domain 140 or write operations for the same type of object) and replace those write requests with a single coalesced write request. In another example, write manager 134 can reduce a number of sequential write requests executed against the data domains 140 by identifying write operations that can be executed in parallel (or substantially in parallel) and replace the plurality of write requests in the execution plan queue with a single entry in the queue including the plurality of write requests and an indication that the plurality of write requests are to be executed in parallel (or substantially in parallel).

At step 450, write manager 134 executes write operations according to the determined execution order. As discussed, in some cases, write manager 134 enforces object dependencies by executing write requests at the top of the execution plan queue and determining that the write requests executed successfully before executing the next set of write requests in the queue. In some cases, if write manager 134 determines that a write request has failed (i.e., that the data was not successfully written to the one or more data domains 140), write manager 134 attempts to execute the write request until the write request completes successfully. If write manager 134 encounters a threshold number of failed write requests, write manager 134 can discontinue attempts to write the composite object and the associated dependency objects and notify a user of client application 122 that the write operation failed.

Figure 5:
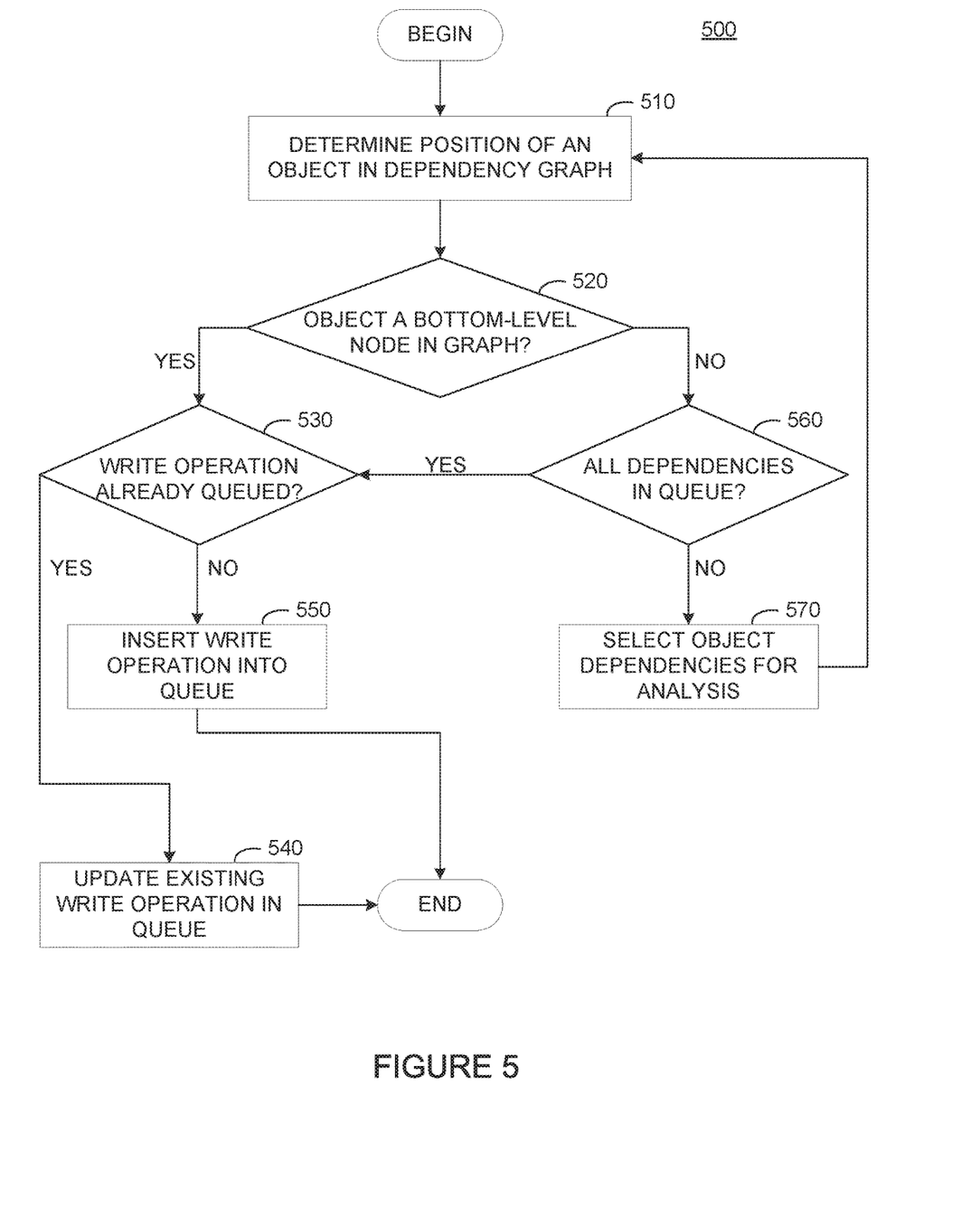
FIG. 5 illustrates example operations for optimizing write requests based on an object dependency graph by coalescing queries in an execution queue, according to one embodiment.

FIG. 5 illustrates example operations 500 for generating an execution plan for the set of write requests associated with writing a composite object and its associated dependency objects, according to an embodiment. As illustrated, operations 500 begin at step 510, where write manager 134 determines a position of the object in an object dependency graph. At step 520, write manager 134 determines if the object is a bottom-level node in the object dependency graph. Generally, an object is a bottom-level node in the object dependency graph if the object does not depend on the existence of other data objects in the one or more data domains 140.

If, at step 520, write manager 134 determines that the object is a bottom-level node in the object dependency graph, at step 530, write manager 134 determines if a write operation for the object is already queued in the execution plan. If the object is already queued, write manager 134 need not insert another write operation into the execution plan queue. Operations 500 may proceed to step 540, where write manager 134 updates the existing write operation in the execution plan queue to write an additional object to the data domain 140 associated with the object. Otherwise, if the object is not yet queued, at step 550, write manager 134 adds the write operation to the execution plan queue.

If, however, at step 520, write manager 134 determines that the object is not a bottom level node in the object dependency graph (e.g., the object is either an intermediary dependency node or the root node representing the composite object to be written to the data domain 140), operations 500 proceed to step 560. At step 560, write manager determines whether write requests for all of the dependency objects of the object are in the execution plan queue. If so, operations 500 proceed to step 530, where, as discussed, write manager 134 determines whether to add a write request to the execution plan queue based on the current contents of the execution plan queue (e.g., the currently-queued write requests). Otherwise, operations 500 proceed to step 570, where write manager 134 selects an object dependency for analysis. Operations 500 return to step 510, where write manager determines the position of the selected object dependency, as discussed above.

Figure 6:
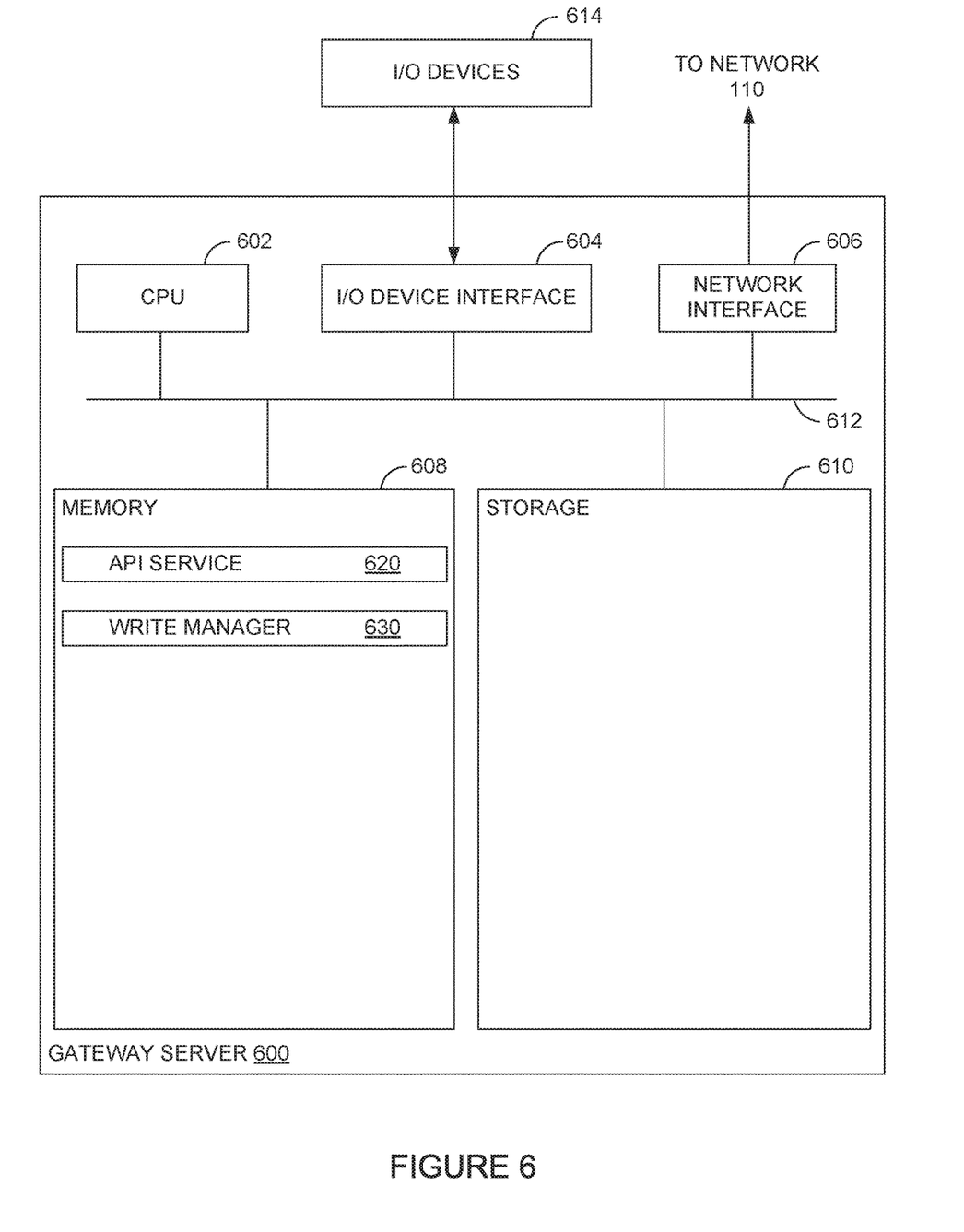
FIG. 6 illustrates an example computing system for writing data to a data store based on a specified object and an object dependency graph, according to one embodiment.

FIG. 6 illustrates a gateway server 600 that receives a write request for a composite object from a client device and generates a plurality of write requests and an execution plan for the plurality of write requests to write the composite object and one or more dependency objects, according to an embodiment. As shown, the system 600 includes, without limitation, a central processing unit (CPU) 602, one or more I/O device interfaces 604 which may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an API service 620 and a write manager 630. API service 620 generally receives a query from a client device 120 and verifies that the received query is valid. In some cases, where API service 620 exposes functions based on a graph schema, API service 620 can traverse a graph projection of the API to verify that the received query is valid. If API service 620 determines that the received query is valid, API service 620 can invoke write manager 630 to generate a plurality of write requests to be executed against one or more of the data domains 140 and generate an execution plan to optimize execution of the generated plurality of write requests, as discussed herein.

Write manager 630 generally receives a request to write a composite object to one or more data domains 140 and generates a plurality of write requests to write the dependency objects associated with the composite object according to an execution plan generated for the plurality of write requests. As discussed, write manager 630 uses information identifying the composite object to be written to the one or more data domains 140 to obtain information about the object dependencies of the composite object to initially populate an object dependency graph for the composite object. Subsequently, for each immediate dependency object of the composite object, write manager 630 examines a definition of the immediate dependency object to determine additional dependency objects to be added to successively lower levels of the object dependency chart.

After write manager 630 generates the object dependency graph for the composite object to be written to the one or more data domains 140, write manager 630 generates a plurality of write requests to write the one or more dependency objects and the composite object to the one or more data domains 140. Write manager 630 may generate an execution plan with the write requests for the objects at the bottom of the object dependency graph being scheduled to execute in the execution plan before objects at higher levels of the object dependency graph.

Write manager 630 can proceed to analyze the generated execution plan to reduce the number of sequential write operations to be performed to commit the composite object and the associated dependency objects to the one or more data domains 140. In some cases, to reduce the number of sequential write operations to be performed against the one or more data domains 140, write manager 630 can coalesce multiple write requests for the same type object into a single write request. In some cases, write manager 630 can examine the generated write requests to identify write requests that can be executed in parallel (or substantially in parallel). Operations that can be executed in parallel or substantially in parallel may be, for example, write requests directed to different data domains 140 that are at the same level in the object dependency graph. By executing these operations in parallel or substantially in parallel, write manager 630 can reduce the number of sequential write requests executed against the one or more data domains 140.

Based on the generated execution plan, write manager 630 executes the plurality of write requests. In some cases, write manager 630 can execute the write requests in stages (e.g., with write requests associated with objects at the bottom of the object dependency graph executing before write requests associated with objects at higher levels of the object dependency graph). Write manager 630 can, in some cases, monitor the execution of the set of write requests to determine whether the set of write requests executed successfully (and thus, that dependencies have been satisfied for objects at a higher level of the object dependency graph). If the set of write requests are successfully executed, write manager 630 can transmit the next set of write requests in the execution plan to the one or more data domains 140 for execution. Otherwise, write manager 630 can attempt to perform a failed write request until the write request succeeds or a threshold number of failures is reached. If the threshold number of failures is reached, write manager 630 may terminate write operations for the composite object and notify client application 122 that an error has occurred.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for writing data to a data store, comprising:
   receiving, from a client device, a write request specifying an object to be written to the data store;
   determining, based on traversing an object dependency graph defining the specified object and identifying relationships between the specified object and dependency objects of the specified object, dependency objects to be written to a plurality of data stores including the data store, wherein the dependency objects comprise objects stored across the plurality of data stores or objects to be written across the plurality of data stores prior to writing the specified object to the data store;
   generating a plurality of write requests for the specified object and the dependency objects, each of the plurality of write requests being directed to one of the plurality of data stores;
   generating an execution plan for the plurality of write requests based on the object dependency graph; and
   executing the plurality of write requests against the plurality of data stores based on the execution plan.

2. The method of claim 1, wherein generating the execution plan comprises:
   instantiating a write request queue;
   traversing the object dependency graph to identify write requests corresponding to independent data objects;
   inserting the write requests corresponding to independent data objects into the write request queue; and
   inserting write requests corresponding to objects dependent on the independent data objects into the write request queue.

3. The method of claim 2, wherein inserting the write requests corresponding to independent objects comprises:
   upon determining that a plurality of write requests in the write request queue are associated with a same object type, coalescing the plurality of write requests into a single write request.

4. The method of claim 2, wherein inserting the write requests corresponding to independent objects comprises:
   upon determining that a plurality of write requests in the write request queue are associated with a same data store location, coalescing the plurality of write requests into a single write request.

5. The method of claim 1, further comprising:
   obtaining the object dependency graph by introspection into a definition of the specified object.

6. The method of claim 1, wherein the object dependency graph comprises a plurality of nodes, each node being associated with an object and including an object name, a location at which the object is stored, and references to one or more other nodes that the object depends on.

7. The method of claim 1, wherein executing the plurality of write requests comprises:
   executing a first write request against a data store specified by the first write request;
   upon detecting a failure to successfully execute the first write request, repeating execution of the first write request; and
   upon detecting that the first write request successfully executed, executing a second write request of the plurality of write requests against a data store specified by the second write request.

8. A system, comprising:
   a processor; and
   a memory storing instructions which, when executed on the processor, perform an operation for writing data to a data store, the operation comprising:
      receiving, from a client device, a write request specifying an object to be written to the data store;
      determining, based on traversing an object dependency graph defining the specified object and identifying relationships between the specified object and dependency objects of the specified object, dependency objects to be written to a plurality of data stores including the data store, wherein the dependency objects comprise objects stored across the plurality of data stores or objects to be written across the plurality of data stores prior to writing the specified object to the data store;
      generating a plurality of write requests for the specified object and the dependency objects, each of the plurality of write requests being directed to one of the plurality of data stores;
      generating an execution plan for the plurality of write requests based on the object dependency graph; and
      executing the plurality of write requests against the plurality of data stores based on the execution plan.

9. The system of claim 8, wherein generating the execution plan comprises:
   instantiating a write request queue;
   traversing the object dependency graph to identify write requests corresponding to independent data objects;
   inserting the write requests corresponding to independent data objects into the write request queue; and
   inserting write requests corresponding to objects dependent on the independent data objects into the write request queue.

10. The system of claim 9, wherein inserting the write requests corresponding to independent objects comprises:

upon determining that a plurality of write requests in the write request queue are associated with a same object type, coalescing the plurality of write requests into a single write request.

11. The system of claim 9, wherein inserting the write requests corresponding to independent objects comprises:
upon determining that a plurality of write requests in the write request queue are associated with a same data store location, coalescing the plurality of write requests into a single write request.

12. The system of claim 8, wherein the operation further comprises:
obtaining the object dependency graph by introspection into a definition of the specified object.

13. The system of claim 8, wherein the object dependency graph comprises a plurality of nodes, each node being associated with an object and including an object name, a location at which the object is stored, and references to one or more other nodes that the object depends on.

14. The system of claim 8, wherein executing the plurality of write requests comprises:
executing a first write request against a data store specified by the first write request;
upon detecting a failure to successfully execute the first write request, repeating execution of the first write request; and
upon detecting that the first write request successfully executed, executing a second write request of the plurality of write requests against a data store specified by the second write request.

15. A non-transitory computer-readable medium comprising instructions which, when executed on one or more processors, performs an operation for writing data to a data store, the operation comprising:
receiving, from a client device, a write request specifying an object to be written to the data store;
determining, based on traversing an object dependency graph defining the specified object and identifying relationships between the specified object and dependency objects of the specified object, dependency objects to be written to a plurality of data stores including the data store, wherein the dependency objects comprise objects stored across the plurality of data stores or objects to be written across the plurality of data stores prior to writing the specified object to the data store;
generating a plurality of write requests for the specified object and the dependency objects, each of the plurality of write requests being directed to one of the plurality of data stores;
generating an execution plan for the plurality of write requests based on the object dependency graph; and
executing the plurality of write requests against the plurality of data stores based on the execution plan.

16. The non-transitory computer-readable medium of claim 15, wherein generating the execution plan comprises:
instantiating a write request queue;
traversing the object dependency graph to identify write requests corresponding to independent data objects;
inserting the write requests corresponding to independent data objects into the write request queue; and
inserting write requests corresponding to objects dependent on the independent data objects into the write request queue.

17. The non-transitory computer-readable medium of claim 16, wherein inserting the write requests corresponding to independent objects comprises:
upon determining that a plurality of write requests in the write request queue are associated with a same object type, coalescing the plurality of write requests into a single write request.

18. The non-transitory computer-readable medium of claim 16, wherein inserting the write requests corresponding to independent objects comprises:
upon determining that a plurality of write requests in the write request queue are associated with a same data store location, coalescing the plurality of write requests into a single write request.

19. The non-transitory computer-readable medium of claim 15, wherein the operation further comprises:
obtaining the object dependency graph by introspection into a definition of the specified object.

20. The non-transitory computer-readable medium of claim 15, wherein executing the plurality of write requests comprises:
executing a first write request against a data store specified by the first write request;
upon detecting a failure to successfully execute the first write request, repeating execution of the first write request; and
upon detecting that the first write request successfully executed, executing a second write request of the plurality of write requests against a data store specified by the second write request.

* * * * *